April 21, 1953 — O. H. SCHUCK — 2,636,167
RADIO CONTROLLED APPARATUS FOR AIR NAVIGATION
Filed Feb. 28, 1949 — 7 Sheets-Sheet 1

FIG. 1

Inventor
OSCAR HUGO SCHUCK
George H Fisher
Attorney

April 21, 1953 O. H. SCHUCK 2,636,167
RADIO CONTROLLED APPARATUS FOR AIR NAVIGATION
Filed Feb. 28, 1949 7 Sheets-Sheet 4

Inventor
OSCAR HUGO SCHUCK
By
George H Fisher
Attorney

April 21, 1953
O. H. SCHUCK
2,636,167
RADIO CONTROLLED APPARATUS FOR AIR NAVIGATION
Filed Feb. 28, 1949
7 Sheets-Sheet 5

FIG. 5

INVENTOR.
OSCAR HUGO SCHUCK
BY
ATTORNEY

April 21, 1953　　　O. H. SCHUCK　　　2,636,167
RADIO CONTROLLED APPARATUS FOR AIR NAVIGATION
Filed Feb. 28, 1949　　　　　　　　　　　　7 Sheets-Sheet 6

Inventor
OSCAR HUGO SCHUCK
By George H Fisher
Attorney

Patented Apr. 21, 1953

2,636,167

UNITED STATES PATENT OFFICE 2,636,167

RADIO CONTROLLED APPARATUS FOR AIR NAVIGATION

Oscar Hugo Schuck, Minneapolis, Minn., assignor to Minneapolis-Honeywell Regulator Company, Minneapolis, Minn., a corporation of Delaware Application February 28, 1949, Serial No. 78,865

6 Claims. (Cl. 343—112)

The invention relates to the field of navigational apparatus, and more particularly to improved radio responsive apparatus for use in aircraft.

In aircraft control it is already known to regulate the operation of individual craft so as to govern the attitude of the craft about three axes to bring about directed, level flight. Devices of this nature are referred to as automatic pilots, and they function well as far as control of a single craft is concerned.

The problem of coordinated control of numerous craft in a sizable area transcends the capabilities of existing automatic pilots, however, and at present is handled by voice communication between the pilots of the various craft and supervisory operators at the control towers of the various airports. Instructions from the towers and the practice known as "stacking" supplement the scheduling and navigating procedures of the various individual flights to make their completion at a busy airport a practicable, if often protracted, process.

Automatic supervision of the craft in an area so that each, following its schedule, arrives at the destination at such an instant that it can land immediately, without unduly cutting down the capacity of any runway by precautionary delays, especially under overcast weather conditions, is a goal which is difficult of achievement, but one which the present invention accomplishes.

Objects of the invention

A general object of the invention is to provide improved aircraft control apparatus by which a number of craft may be travelling toward an airport, by following radio signals, without increase in the collision hazard as the airport is approached.

Another object of the invention is to provide improved aircraft control apparatus, including radio actuated means, for enabling the pilots of the various craft to arrive at the airport at such intervals that stacking at the airport of arrival is unnecessary.

A more specific object is to provide means, for installation in an aircraft, which is capable of deriving bearing data from the radiations of a selected pair of radio ground stations, and of computing from these data the coordinates of the position of the craft at any time in a coordinate system which may be brought into a desired alignment with the positions of the transmitting stations and with a desired ground path.

Another object of the invention is to provide means, as described above, capable of controlling the azimuth of the craft so that it follows a given straight line path, and so that that path may be any selected one of a number of mutually parallel paths.

Another object of the invention is to provide a navigating computer capable of deriving from the radio signals above described an output proportional to the departure of the craft from a selected straight line course.

Another object of the invention is to provide a navigating computer capable of deriving from the radio signals above described an output proportional to the distance from a craft to its destination.

Another object of the invention is to provide manually adjustable and automatically radio-responsive computing means to give output voltages corresponding to the components, along the X- and Y-axes of a Cartesian system, of the displacement of a craft carrying the computing means from an on-course position at the destination. Stated differently, the computing means determines from bearing radio signals, supplied by a pair of Omnidirectional Ranges, and from manually adjusted settings correlating the computer with the terrain over which the flight is being conducted, the off-track distance and the distance to destination of the craft.

A specific object of the invention is to provide means for computing the values of $x_p$ and $y_p$ in the following equations:

$$x_p = \frac{x_2 \cot(B_2-C) - x_1 \cot(B_1-C) - y_2 + y_1}{\cot(B_2-C) - \cot(B_1-C)}$$

and $$y_p = \frac{x_2 - x_1 + y_1 \tan(B_1-C) - y_2 \tan(B_2-C)}{\tan(B_1-C) - \tan(B_2-C)}$$

where $x_1$, $x_0$, $y_1$, $y_2$ and $C$ are manually settable, while $B_1$ and $B_2$ are automatically varied in accordance with bearing information received by radio.

Another specific object of the invention is to provide means for automatically determining the quotient of two numbers, in which each number is represented by an electric current flowing in a circuit including a resistor and one primary winding of a transformer, one of the resistors then being adjusted to vary the current in magnitude and direction so as to reduce the magnetomotive force in the transformer to zero, and the amount of adjustment of the variable resistor required being taken as a measure of the quotient desired.

Yet another specific object of the invention is to provide means as just described, in which the adjustment of the variable resistor is performed in accordance with the secondary voltage of the transformer.

A further specific object of the invention is to provide means as just described, in which the dividend, or divisor, or each of them, comprises a polynomial each term of which is represented by a voltage varied in accordance with the magnitude of the term.

A further specific object of the invention is to provide means whereby certain of said terms may be varied as a tangent or cotangent function of an angular variable.

Various other objects, advantages and features of novelty which characterize my invention are pointed out with particularity in the claims annexed hereto and forming a part hereof. However, for a better understanding of the invention, its advantages, and objects obtained by its use, reference should be had to the subjoined drawings, which form a further part hereof, and to the accompanying descriptive matter, in which is illustrated and described a preferred embodiment of the invention. In the drawing:

The problem of azimuth control

Figure 1:
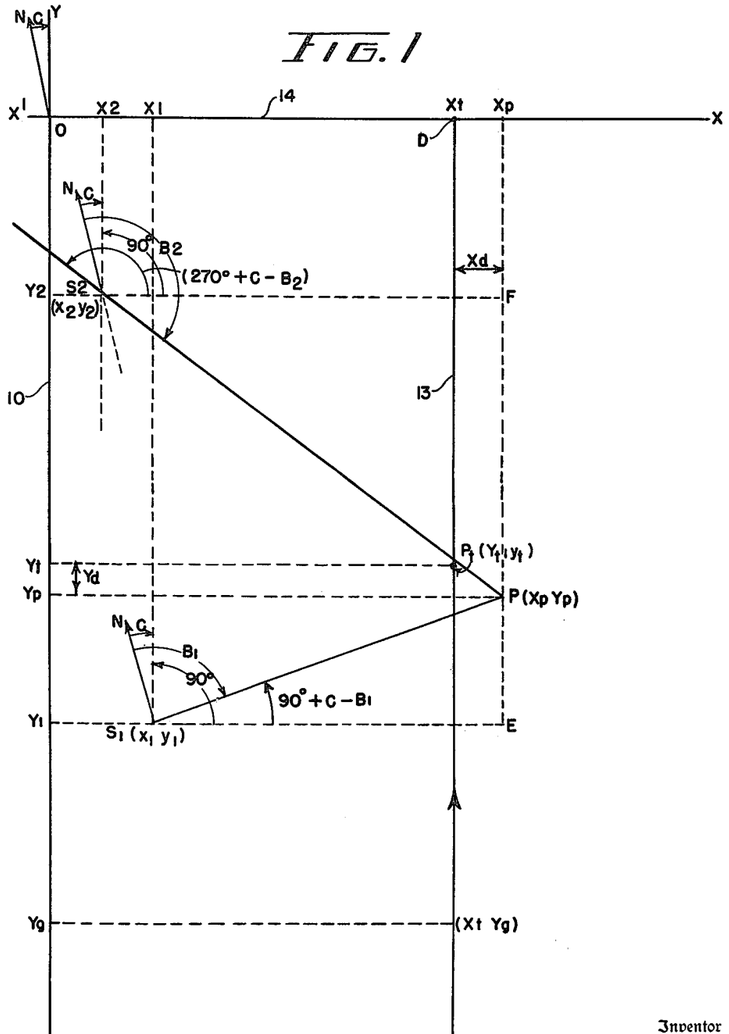
Figure 1 is a diagram showing spatial relationships involved in the practice of the invention.

Figure 1 is in the nature of a map of an area to be traversed by aircraft. From a study of the terrain and a knowledge of traffic requirements, it is first determined that the center line of a straight ground path between the neighborhood of an airport of arrival and that of some distant airport of departure is along the line 10. At suitable locations between the two air strips and within 50 miles of the line 10 radio ground stations $S_1$ and $S_2$ are established. The area is charted, and there is superimposed upon the chart a system of Cartesian coordinates the Y-axis of which coincides with line 10. The origin of the coordinates is spaced an arbitrarily selected distance from the airport of destination to permit let-down maneuvers. The geographic bearing C of the Y-axis is recorded, as are also the coordinates $x_1$, $y_1$ and $x_2$, $y_2$ of the ground stations. The X-coordinate of each station will be referred to as its "offset," and the Y-coordinate will be referred to as its "onset."

A number of ground paths parallel to the center line 10 and spaced therefrom by intervals of say ten miles may now be laid out on the chart, in order to permit simultaneous movement of craft at different speeds and, if desired, in different directions. The X-coordinate or scheduled offset in each of these paths remains the same throughout its length: one such path, having an absicissa $x_t$, is shown by line 13, which intersects the X-axis at D. The X-axis 14 is hereafter referred to as the terminus of arrival, since when this line is crossed a change in the operation of the system must be made with the object of bringing the craft to a landing.

For simplicity of discussion the showing of Figure 1 has been made special to the extent that the craft, the assigned track, and the two ground stations all lie mathematically in the fourth quadrant: all the X-coordinates are thus positive and all the Y-coordinates are negative. As a practical matter any or all of these variables may lie in either the third quadrant or the fourth quadrant, and the polarity of each abscissa must be considered according to the quadrant in which it lies. The only ordinate which can ever be positive in a normal layout of the system is $y_p$ presently to be defined, and this only if the craft goes beyond the X-axis of the coordinates; that is if the craft overshoots its destination.

For purposes of illustration let it be assumed that the craft is ordered to follow the line 13, and that in fact it is at some moment located at point P, where its coordinates are $x_p$, $y_p$. In such a case its off-track distance $x_d$ has a value given by the following equation:

$$x_d = (x_p - x_t) \quad (1)$$

If an indicator of $x_d$ is provided for the pilot of an aircraft he can maintain the craft on a desired ground path simply by keeping the reading of the $x_d$ indicator at zero.

One function of the invention is to determine the value of $x_p$ from information made available as a result of the radio transmissions from stations $S_1$ and $S_2$. Each of these stations emits a radiation from which there can be determined the geographic bearing of the position of the craft from the station: the bearings are indicated in Figure 1 by the symbol $B_1$ and $B_2$ respectively. There are thus provided sufficient data to determine the value of $x_p$ according to the following mathematical analysis.

The point-slope form of the equation for a straight line in Cartesian coordinates is $$y - y_1 = m(x - x_1), \text{ or } y = mx - (mx_1 - y_1) \quad (2)$$

Applying this formula to the straight lines passing through stations $S_1$ and $S_2$ in Figure 1, the following equations result:

$$y = m_1 x - (m_1 x_1 - y_1) \quad (3)$$

and $$y = m_2 x - (m_2 x_2 - y_2) \quad (4)$$

The craft is located at the point of intersection $x_p$, $y_p$ of these lines. To evaluate $x_p$ in terms of $x_1$, $x_2$, $y_1$, $y_2$, $m_1$, and $m_2$, let $x = x_p$ and $y = y_p$ in the foregoing equations and solve simultaneously for $x_p$ and $y_p$:

$$y_p = m_2 x_p - (m_2 x_2 - y_2) \quad (5)$$

and $$y_p = m_1 x_p - (m_1 x_1 - y_1) \quad (6)$$

subtracting, $$x_p = \frac{(m_2 x_2 - y_2) - (m_1 x_1 - y_1)}{m_2 - m_1} \quad (7)$$

From Figure 1 it will be apparent that $$m_1 = \tan(90° + C - B_1) = \cot(B_1 - C) \quad (8)$$

and $$m_2 = \tan(270° + C - B_2) = \cot(B_2 - C) \quad (9)$$

hence $$\frac{1}{m_1} = \tan(B_1 - C) \quad (10)$$

and $$\frac{1}{m_2} = \tan(B_2 - C) \quad (11)$$

Substituting these values in Equation 7 gives $$x_p = \frac{x_2 \cot(B_2 - C) - x_1 \cot(B_1 - C) - y_2 + y_1}{\cot(B_2 - C) - \cot(B_1 - C)} \quad (12)$$

Hence $$x_d = \frac{x_2 \cot(B_2 - C) - x_1 \cot(B_1 - C) - y_2 + y_1}{\cot(B_2 - C) - \cot(B_1 - C)} - x_t \quad (13)$$

Means for computing off-track distance

Figure 2:
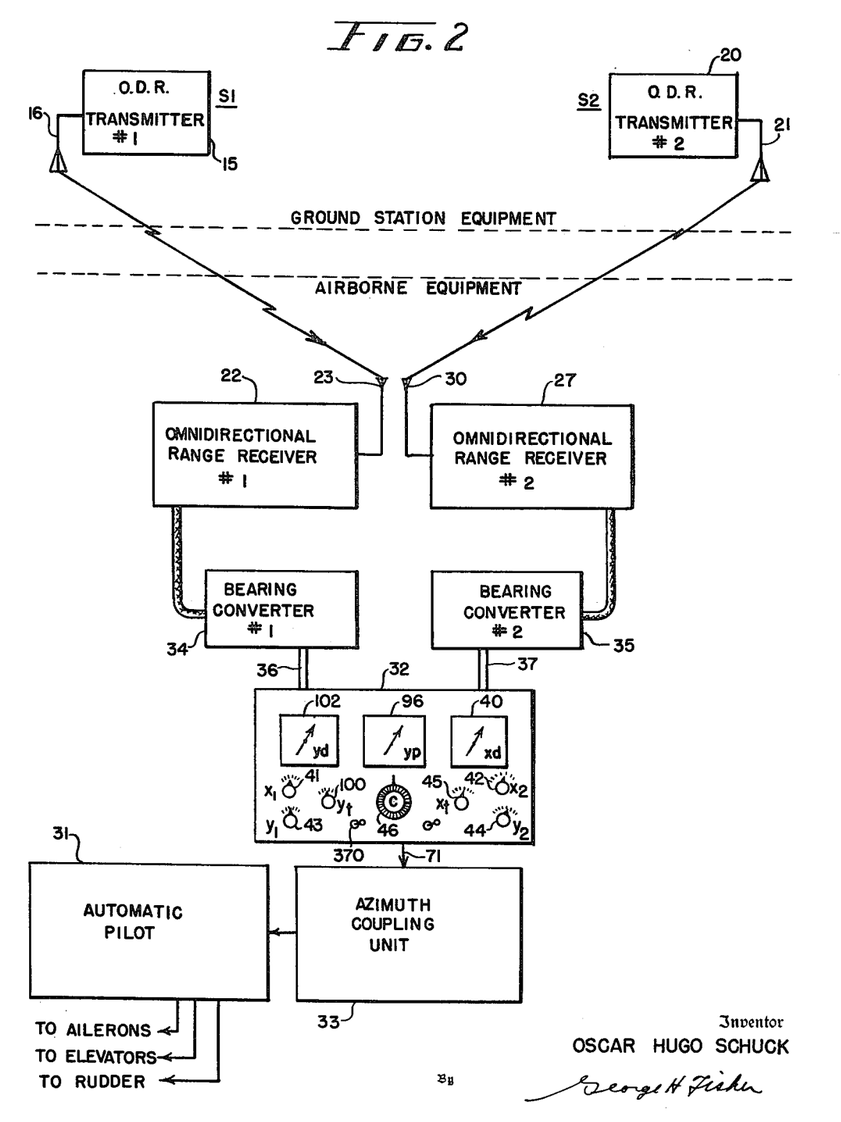
Figure 2 is a general view of the elements making up an embodiment of the invention.

The general relation of instruments functioning to solve Equation 13 is shown in Figure 2. The equipment at ground station $S_1$ comprises the transmitter 15 of an Omnidirectional Range having a transmitting antenna system 16. The equipment at ground station $S_2$ comprises the transmitter 20 of an Omnidirectional Range having a transmitting antenna system indicated at 21. The air-borne equipment includes a first Omnidirectional Range receiver 22 having a receiving antenna system 23, and a second Omnidirectional Range receiver 27 having a receiving antenna system 30. The term "Omnidirectional Range" refers to a specific radio unit known in the art by that name and described in the January 1942 issue of the "RCA Review," volume 6, No. 3, pages 344 to 369.

The craft may be equipped with an automatic pilot 31, and a navigating computer 32 controls the automatic pilot, through a suitable azimuth coupling unit 33, in accordance with the Omnidirectional Range signals, transmitted through bearing converters 34 and 35. Converters 34 and 35 are necessary to make the electrical signals of the Omnidirectional Range receivers available as mechanical motions to affect the computer, and azimuth coupling unit 33 is provided to modify the output of the computer according to its rate of change, and to derive therefrom inputs suitable to the nature of the particular automatic pilot of the craft.

Figure 3:
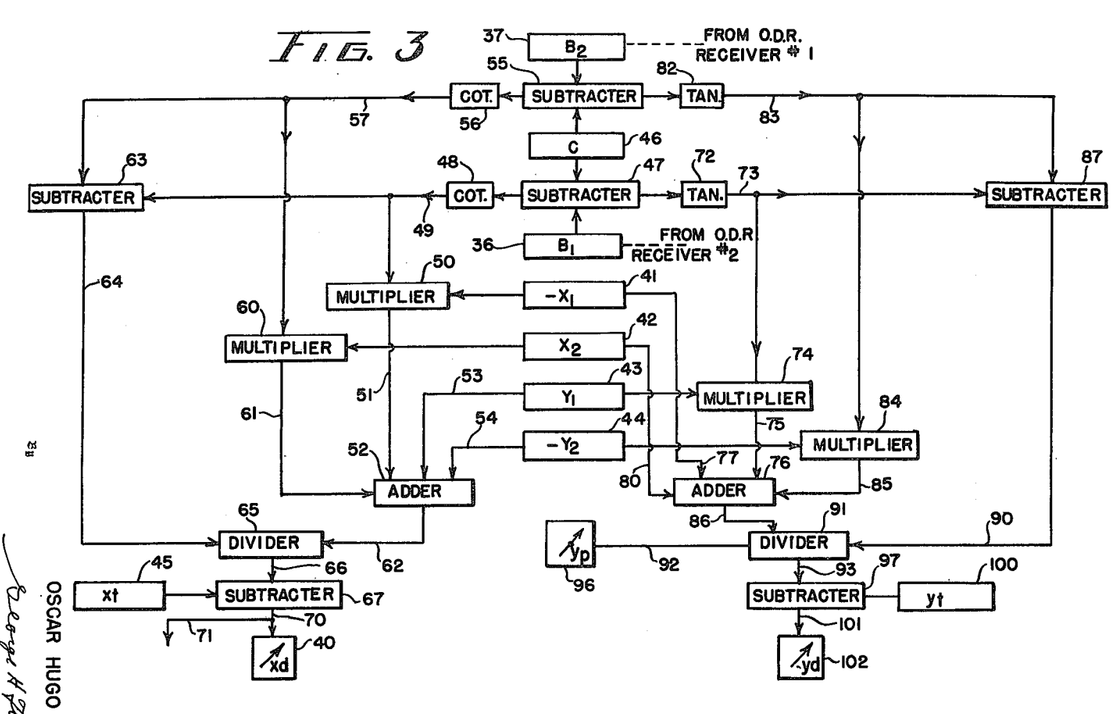
Figure 3 is a block diagram showing the functional relationship of elements making up the system of Figure 2.

As explained below, the output of bearing converter 34 is mechanical rotation of a shaft 36 in proportion to the angle $B_1$, and the output of bearing converter 35 is mechanical rotation of a second shaft 37 in proportion to the angle $B_2$. These shafts are represented in Figure 3 as influencing the reading of an indicator 40 through a chain of authority which includes further inputs from manual knobs 41, 42, 43, 44, 45 and 46 which are movable with respect to graduated scales. Knobs 41 and 42 are adjusted in accordance with the magnitude of the X-coordinates $x_1$ and $x_2$ of the locations of the ground stations. Knobs 43 and 44 are adjusted in accordance with the Y-coordinates $y_1$ and $y_2$ of the locations of the ground stations. Knob 45 is adjusted in accordance with the X-coordinate $x_t$ of the desired ground path. Knob 46 is adjusted in accordance with the value of angle C for the particular path being flown.

The various functions performed in the navigating computer are suggested by the various blocks in Figure 3, but it will be realized that numerous ways of performing these functions, as electrical, mechanical, hydraulic, and so forth, will occur to those skilled in the art. In connection with Figures 4 and 5, later to be discussed, there will be presented full disclosure of means for performing each of these functions, and for the present only the relation of each to the overall result will be considered.

As shown in Figure 3, the difference between the inputs from knob 46 and shaft 36 is taken in a subtractor 47 and applied to a cotangent device 48 from which it emerges as an output 49 proportional to cot $(B_1-C)$. This and an input from knob 41 are supplied to a multiplier 50. The output 51 of the multiplier, having the value $-x_1$ cot $(B_1-C)$ is supplied to an adder 52 with inputs 53 and 54 from knobs 43 and 44.

The difference between the inputs from knob 46 and shaft 37 is taken in a second subtractor 55 and applied to a second cotangent device 56 from which it emerges as an output 57 proportional to cot $(B_2-C)$. This and an output from knob 42 are supplied to a second multiplier 60. The output 61 of the multiplier, having the value $x_2$ cot $(B_2-C)$, is also supplied to adder 52. Since the inputs 61, 51, 54, and 53 have the values $x_2$ cot $(B_2-C)$, $-x_1$ cot $(B_1-C)$, $-y_2$, and $y_1$, it is apparent that the output 62 of adder 52 is the enumerator of the fraction on the right hand side of Equation 12.

The outputs 49 and 57 from cotangent devices 48 and 56 are also supplied to a subtractor 63, whose output 64 has a value $$\cot(B_2-C) - \cot(B_1-C)$$

the denominator of the same fraction. Outputs 62 and 64 are combined in a divider 65, whose output 66 is the right hand side of Equation 12 and is hence equal to $x_p$. This is combined with an input from knob 45 in a subtractor 67, whose output 70 operates indicator 40 to a value $x_p-x_t$, or $x_d$, and may also be supplied as at 71 to azimuth coupling unit 33, the output of which is connected to cause operation of automatic pilot 31, whenever $x_d$ is not zero, so as to cause the craft to return to the desired ground path.

The apparatus described above comprises means for maintaining a craft on a selected ground path and for indicating to a human pilot any departure therefrom as it occurs, so that to a limited extent he is independent of ground landmarks, overcast weather, and variable cross winds. The information is not sufficient, however, to give the pilot his location in space, other than the knowledge that he is on a given line.

Spot supervision of distance travelled

Referring again to Figure 1, suppose that in some manner it is known that, at the instant when the craft is actually at P, it should be located at $P_t$. The off-track component $x_d$ of this discrepancy may be determined as indicated above, and the azimuth of the craft adjusted accordingly. Following the same line of reasoning, the along track component $y_d$ may be determined according to the following mathematical analysis.

First substitute the value for $x_p$, obtained in Equation 12, in Equation 5, collect terms, and divide numerator and denominator by $m_1 m_2$: there results the equation $$y_p = \frac{\left(x_2 - \frac{1}{m_2}y_2\right) - \left(X_1 - \frac{1}{m_1}y_1\right)}{\frac{1}{m_1} - \frac{1}{m_2}} \qquad (14)$$

Then by substituting the slope values given in Equations 8–11 Equation 14 becomes $$y_p = \frac{x_2 - x_1 + y_1 \tan(B_1-C) - y_2 \tan(B_2-C)}{\tan(B_1-C) - \tan(B_2-C)} \qquad (15)$$

and $$y_d = y_p - y_t \qquad (16)$$

by inspection. A negative value for $y_d$ indicates that the craft is farther from its destination than it should be.

Figure 4:
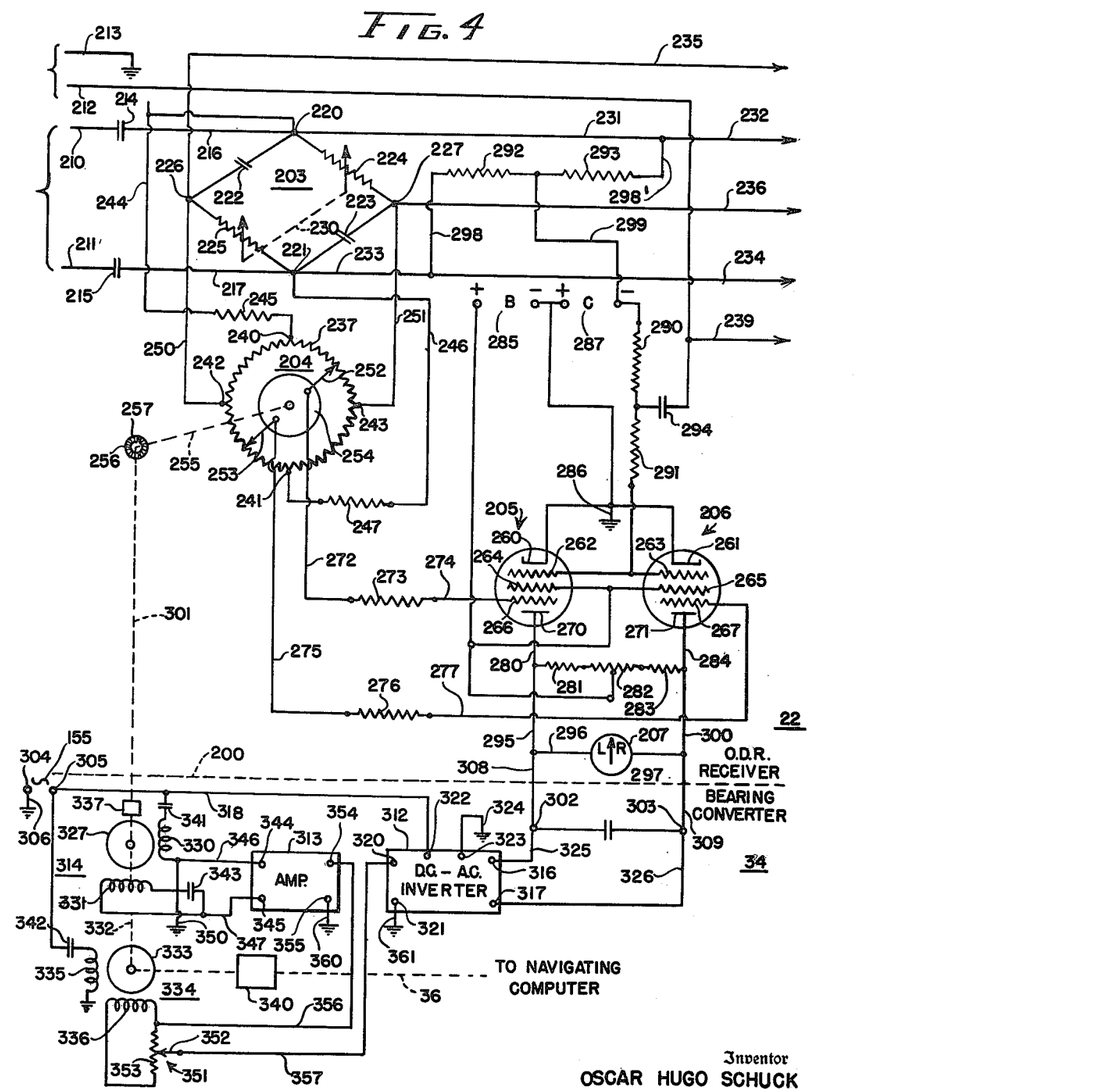
Figure 4 is a similar showing of a converter for connecting the Omnidirectional Range receiver to the computer.
Figure 5:
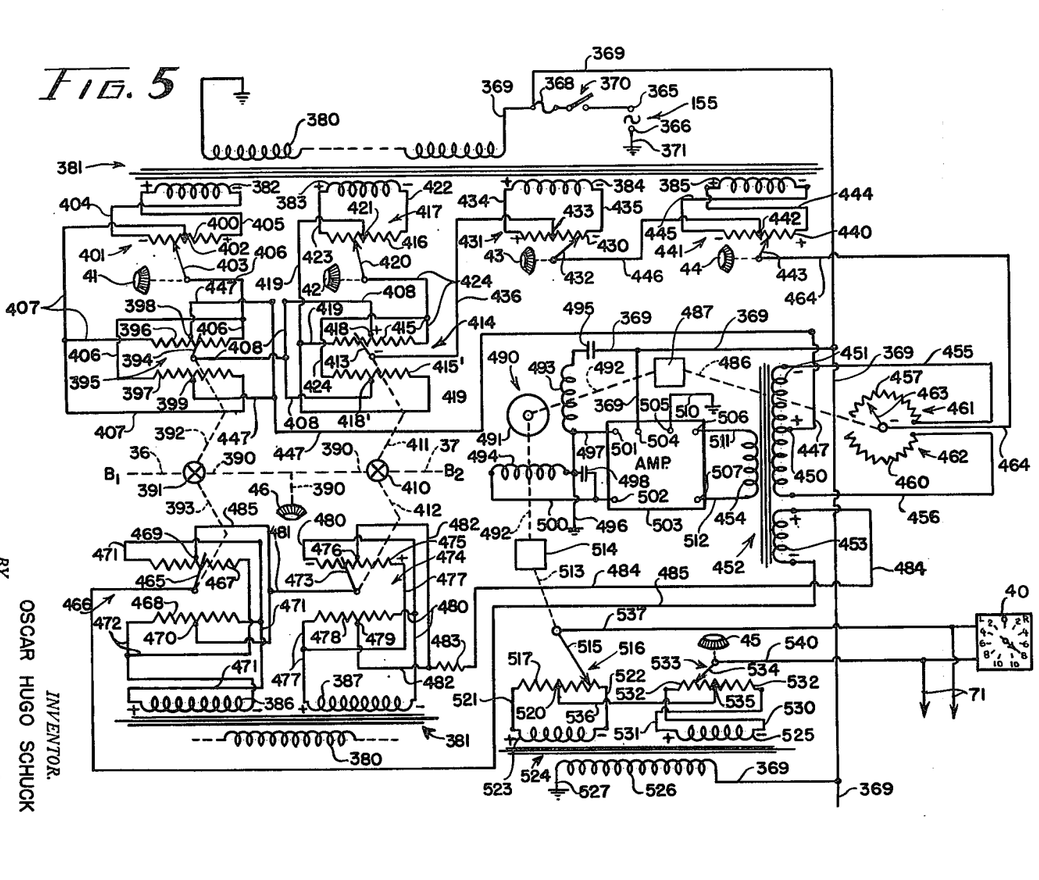
Figures 5 and 6 show details of the azimuth and range components of a navigating computer according to the invention.

Inspection of Equation 15 above shows it to be of the same general form as that for $x_p$, and the structure for performing the computation is very similar, as is shown in Figures 3, 4 and 5: it has many components in common with the structure for determining $x_p$.

Means for determining distance to destination and off-schedule distance

Subtractor 47 in Figure 3 is shown as driving a tangent device 72 whose output 73 is hence proportional to tan $(B_1-C)$. This and an input from knob 43 are supplied to a multiplier 74. The output 75 of the multiplier, having the value $y_1$ tan $(B_1-C)$, is supplied to an adder 76, with inputs 77 and 80 from knobs 41 and 42.

The output from subtractor 55 is applied to a second tangent device 82 from which it emerges as an output 83 proportional to tan $(B_2-C)$. This and an output from knob 44 are supplied to a further multiplier 84. The output 85 of the multiplier, having the value $-y_2$ tan $(B_2-C)$, is also supplied to adder 76. Since the inputs 80, 77, 75 and 85 have the values $x_2$, $-x_1$ tan $(B_1-C)$, and $-y_2$ tan $(B_2-C)$, it is apparent that the output 86 of adder 76 is the numerator of the fraction on the right hand side of Equation 15. The outputs 73 and 83 from tangent devices 72 and 82 are also supplied to a subtracter 87, whose output 90 has a value tan $(B_1-C)$ $-$tan $(B_2-C)$, the denominator of the same fraction. Outputs 86 and 90 are combined in a divider 91, which supplies outputs 92, and 93 equal to the right hand side of Equation 15 and hence to $y_p$. Output 92 drives an indicator 96 displaying the value of $y_p$. Output 93 is combined in a subtracter 97 with the output from a knob 100, and the output 101 of the subtracter operates an indicator 102 to a value $y_p-y_t$ or $y_d$.

The proper setting of knob 100 at any time may, for example, be determined by the pilot from a previously prepared tabulation of Y-coordinate against elapsed time, or one of Y-coordinate against actual time for the particular flight, and is correct only for an instant. At that instant, however, indicator 102 has a reading which is a measure of the distance by which the craft is ahead or behind its scheduled position. The pilot is thus given means for spot checking his progress along the ground path from time to time against that required by his schedule, and he may decrease or increase his air speed accordingly.

Indicator 102 in combination with the rest of the computer may also serve a further useful function. If knob 100 is set to the Y-coordinate $y_g$ of the terminus of departure, indicator 102 shows the number of along-track miles already travelled, while if knob 100 is set to the Y-coordinate of the terminus of arrival, that is, to zero, indicator 102 shows the number of along-track miles yet to be flown.

The Omnidirectional Range

The Omnidirectional Range comprises in effect a transmitter and a receiver for respectively emitting and responding to a high frequency carrier upon which are impressed a sinusoidal low frequency modulation and a keyed impulse voltage. At the transmitter an antenna array is so energized that the directions of maximum intensity of the carrier rotate about the antenna at the low frequency. The impulse voltage is transmitted when the positive maximum of the carrier is due north of the transmitter, so that in any other direction from the transmitter there is an interval between the instant of reception of the pulses and the instant when the carrier reaches its peak value. The function of the Omnidirectional Range receiver is to respond to this interval by giving an indication of the direction of the receiver from the transmitter.

Such portions of the structure of an Omnidirectional Range receiver as are necessary to an understanding of the present invention are shown above the dotted line 200 in Figure 4. The principal components of the receiver are a phase splitting bridge 203, a universal phase shifter 204, a pair of pentodes 205 and 206, and an indicator 207 which is essentially a D. C. voltmeter with a center zero reading. Portions of the receiver, not shown, demodulate the carrier and feed the low frequency modulation to an automatic gain control circuit and a filtering amplifier. The output of the filtering amplifier, representing the sinusoidal modulation of the carrier at the transmitter, appears between conductors 210 and 211 in Figure 4. The received impulse voltage appears between conductors 212 and 213, the latter being grounded.

Coupling capacitors 214 and 215 and conductors 216 and 217 impress the filtered low frequency modulation signal upon the input terminals 220 and 221 respectively of phase splitting bridge 203, which comprises a pair of fixed capacitors 222 and 223 forming opposite arms of the bridge, and a pair of resistors 224 and 225 forming the remaining arms of the bridge. In order to permit adjusting the bridge so that the voltage at its output terminals 226 and 227 is 90° out of phase with the voltage on its input terminals, resistors 224 and 225 are made adjustable by means 230. Voltages from terminals 220, 221, 226 and 227 of the phase splitting bridge are made available to other portions of the system not here described by conductors 231 and 232, 233 and 234, 235, and 236 respectively.

The output of phase splitting bridge 203 is impressed upon universal phase shifter 204 in order to provide a voltage which may vary in phase through 360 degrees. Phase shifter 204 comprises an endless resistance winding 237 tapped at four equally spaced points 240, 242, 241 and 243. Input terminal 220 of bridge 203 is connected to tap 240 of phase shifter 204 by conductor 244 and resistor 245, terminal 221 to tap 241 by conductor 246 and resistor 247, and terminals 226 and 227 to taps 242 and 243 by conductors 250 and 251.

Movable unitarily with respect to winding 237 are a pair of mutually insulated sliders 252 and 253 carried by a suitable member 254 driven by a shaft 255 for rotation by operation of a manual knob 256: a scale 257 is provided for indicating the rotated position of knob 256. The arrangement is such that when slider 252 is in contact with tap 240 and slider 253 is in contact with tap 241, the voltage between sliders 252 and 253 is in phase with the voltage between conductors 210 and 211. When the sliders are rotated from this position by 180 degrees the phase of the voltage between them is 180 degrees from the input voltage, and as they are rotated clockwise or counterclockwise from the zero position, the voltage between the sliders correspondingly leads or lags the input voltage. Accordingly, as member 254 rotates clockwise from the position where slider 252 contacts tap 240, the voltage between sliders 252 and 253 varies in phase from a phase angle of 0 continuously through 260 degrees of phase angle.

This continuously variable voltage is supplied to pentodes 205 and 206, comprising respectively cathodes 260 and 261, control grids 262 and 263, screen grids 264 and 265, suppressor grids 266 and 267, and plates 270 and 271. Slider 252 is connected to suppressor grid 266 of pentode 205 by conductor 272, resistor 273, and conductor 274: similarly, slider 253 is connected to suppressor grid 267 of pentode 206 by conductor 275, resistor 276 and conductor 277. Plate 270 of pentode 205 is connected to plate 271 of pentode 206 by conductor 280, a resistor 281, a voltage divider 282, a resistor 283, and conductor 284, and positive plate potential is applied to the slider of voltage divider 282, and to screen grids 264 and 265, from a suitable source 285, the negative terminal of which is grounded at 286, as are cathodes 260 and 261. Bias voltage from a source 287 is supplied to the control grids 262 and 263 through a pair of resistors 290 and 291, and to the suppressor grids 266 and 267 through phase shifter 204, bridge 203, conductors 298 and 298', a pair of resistors 292 and 293 and conductor 299.

The impulse voltage is applied to control grids 262 and 263 of the pentodes through ground connections 213 and 286 and through conductor 212, capacitor 294, and resistor 291, and is also made available to other portions of the system by a conductor 239. The impulse voltage provides a fixed point in time with which comparison of the output voltage of the phase shifter 204 is to be made; the latter voltage is applied to the pentode suppressor grids in opposite phase relation, while the impulse voltage is applied on the control grids of the pentodes in the same phase relation. When the phase shifter is set at zero the pulse coincides with the positive peak of voltage on one suppressor grid, say that of pentode 205, and the negative peak of voltage on the other grid. If the phase shifter is rotated through 180 degrees the pulse coincides with the positive peak of the voltage on the suppressor grid of pentode 206, and the negative peak of the voltage on the suppressor grid of pentode 205. With a unidirectional anode voltage and with suitable grid bias voltages, the arrangement causes the pentodes to discharge equally when the phase shifter is at 90 and 270 degrees, moving from a maximum discharge of pentode 205 and a minimum discharge of pentode 206 when the phase shifter is at zero through a maximum discharge of pentode 206 and a minimum discharge of pentode 205 when the phase shifter is at 180 degrees.

Indicator 207 is connected between the plates of the pentodes by conductors 280, 295, 296, 297, 300 and 284. When the pentodes discharge equally the indicator is at its central zero position: if pentode 205 discharges more than pentode 206, the needle of the indicator swings to the left while if pentode 206 discharges more than pentode 205, the needle swings to the right. In other words, the voltage between conductors 295 and 300 is a unidirectional voltage of variable magnitude and reversible polarity.

If the craft is due north of the transmitter, the pulse and the voltage peak occur at the same time. For indicator 207 to give an on course or center zero indication, phase shifter 204 must be set to give a 90 degree phase shift between input and output. This corresponds to the "North" indication of knob 256 on scale 257. If the craft is east of the transmitter, the impulse precedes the voltage peak by an interval corresponding to 90 degrees of the low frequency. Adjustment of phase shifter 204 to delay the voltage peak by 90 degrees causes the pentodes to again discharge equally. The instrument is designed to be used by setting the phase shifter knob to the angle from which it is desired to approach the station, and then to fly the craft so that the indicator reading remains zero.

*Construction of the bearing converter*

If means can be provided whereby shaft 255 is driven always to such a position that indicator 207 reads zero, the position of the shaft is then a measure of the bearing of the craft's position from the transmitter. This adaptation of the Omnidirectional Range receiver is what converter 34 is designed to perform, and to this end the converter is mechanically connected to receiver 22 and computer 32 by shafts 301 and 36.

Converter 34 comprises a pair of input terminals 302 and 303 connected to the indicator by conductors 308 and 296, and 297 and 309, a pair of power terminals 304 and 305 of which the former is grounded as at 306, and a pair of output shafts 301 and 36 connected respectively to knob 256 of the Omnidirectional Range receiver and to computer 85. The principal components of the converter are an inverter 312, a motor control amplifier 313, and a motor 314.

Inverter 312 comprises input terminals 316 and 317, output terminals 320 and 321, and power terminals 322 and 323. Alternating voltage from a source 155 is applied to terminals 304 and 305 and hence by ground connections 306 and 324 and conductor 318 to inverter 312, which functions to convert unidirectional voltage applied to input terminals 316 and 317 into alternating voltage appearing at output terminals 320 and 321, the alternating voltage being of the frequency of source 155, and varying in amplitude and reversing in phase with variation in the magnitude and reversal of the polarity of the applied unidirectional voltage: such devices are known. Inverter 312 is connected to input terminals 302 and 303 by conductors 325 and 326.

Motor 314 comprises a rotor 327 and a pair of stator windings 330 and 331. Rotor 327 is mounted on a shaft 332 and unitary therewith is the rotor 333 of a velocity generator 334 having a primary winding 335 and a secondary winding 336. Output shafts 301 and 36 are respectively connected to shaft 332 through suitable reduction gearing 337 and 340. Quadrature capacitor 341 and phasing capacitor 342 are provided in the circuits of windings 330 and 335, which are continuously energized from source 155. A capacitor 343 is connected across winding 331 of motor 314 to improve its power factor: this winding is energized from the output terminals 344 and 345 of amplifier 313 by conductors 346 and 247, the former being grounded as at 350.

A voltage divider 351 comprising a slider 352 movable with respect to a winding 353 is connected across secondary winding 336 of velocity generator 334, and the output of this divider is applied, in series with the output of inverter 312, to the input terminals 354 and 355 of amplifier 313, through conductors 356 and 357 and ground connections 360, and 361. Amplifier 313 is of the type in which a voltage output is obtained in the same phase and frequency as the voltage applied to its input.

*Operation of the bearing converter*

Suppose the craft is at the location P, with respect to the transmitter $S_1$, shown in Figure 1; here the bearing of the craft from the transmitter is 85 degrees measured clockwise from north. If phase shifter 204 is set at 85 degrees, pentodes 205 and 206 discharge equally, conductors 295 and 300 are at the same potential, and no voltage is applied to input terminals 302 and 303 of inverter 35. The output from unit 312 is zero, and motor 314 is not energized for rotation.

If phase shifter 204 is set at some other value, the pentodes discharge unequally, indicator 207 gives a reading, and a unidirectional voltage is impressed on input terminals 302 and 303. This voltage is converted to alternating voltage in inverter 312, and impressed upon amplifier 313, whose output energizes motor 314 to operate in one direction or the other, according to the polarity of the input voltage. Operation of motor 314 rotates shaft 36 and readjusts knob 256 through shaft 301 until it reads 85 degrees, the adjustment simultaneously altering the phase of the pentode suppressor grid voltages to make the pentodes discharge equally, at which point the voltage to the inverter disappears, and the motor stops running. Velocity generator 334 serves to give the circuit antihunt properties.

By this means the position of shaft 36 is always a measure of the bearing of the craft from the transmitter: as the craft moves the phase relation between the pulse and the phase shifter output changes, and operation of motor 314 to correct the position of shaft 36 immediately results.

The navigating computer

Figure 6:
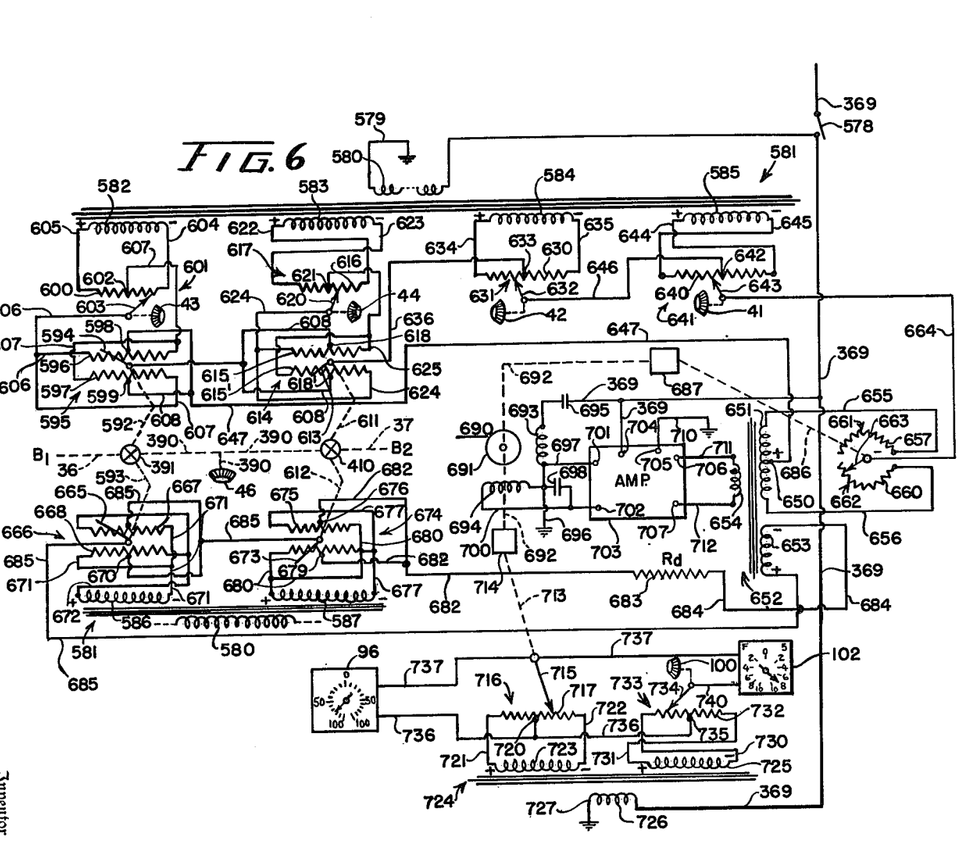

Figures 5 and 6 together show details of the structure of navigating computer 32. The navigating computer is energized at power terminals 365 and 366 with alternating voltage from source 155, the latter terminal being grounded at 371 and the former connected through a main switch 370 and a main fuse 368 to power bus 369. The cross-track portion of navigating computer 32 comprises the subject matter of Figure 5, and the along-track portion of the computer comprises the subject matter of Figure 6.

Structure of the cross-track portion of the navigating computer

Power bus 369 in Figure 5 is shown to energize the primary winding 380 of a transformer 381 which for convenience of illustration is shown as divided into two portions, one at the upper part of the figure including secondary windings 382, 383, 384 and 385 and another at the bottom of the figure including secondary windings 386 and 387. Mechanical inputs are supplied to this portion of the navigating computer along shafts 36 and 37 from bearing converters 34 and 35, and along shaft 390 from knob 46, which is manually operated in accordance with the required value of the angle C. The rotations of shafts 36 and 390 are combined in a differential 391, having a first output shaft 392 and a second output shaft 393.

Shaft 392 actuates the slider 394 of a voltage divider 395, having a pair of windings 396 and 397 center tapped at 398 and 399, and comprising a part of cotangent device 48 of Figure 3. Its structure will be given in more detail below.

Secondary windings 382 of transformer 381 energizes the winding 400 of a voltage divider 401, having a center tap 402 and a slider 403, through conductors 404 and 405. Slider 403 is connected to one end of winding 396 and one end of winding 397 by conductor 406, and center tap 402 is connected to the other ends of windings 396 and 397 by conductor 407. Slider 403 is adjustable along winding 400 by manual knob 41 to a value proportional to $-x_1$: the voltage between center tap 402 and slider 403 is therefore also proportional to $-x_1$, and of this voltage a portion proportional to the cotangent of $B_1-C$, determined by the position of slider 394 on winding 396 or winding 397 is taken and appears between slider 394 and a conductor 447 connected to center taps 398 and 399.

The mechanical rotations of shafts 37 and 390 are combined in a mechanical differential 410 having output shafts 411 and 412. Shaft 411 is shown as driving the slider 413 of a second voltage divider 414 having a pair of windings 415 and 415', center tapped at 418 and 418' and comprising a part of cotangent device 56 of Figure 3.

Secondary winding 383 of transformer 381 energizes the winding 416 of a voltage divider 417, having a slider 420 and a center tap 421, through conductors 422 and 423. A conductor 419 is connected to center tap 421 and also to one end of winding 415 and one end of winding 415' of voltage divider 414. Slider 420 is connected with the other ends of windings 415 and 415' by a conductor 424, and is adjusted by manual operation of knob 42 in proportion to the magnitude of $x_2$. Accordingly the voltage between center tap 421 and slider 420 is proportional to $x_2$. Of this voltage a portion determined by the setting of slider 413 on winding 415 or winding 415' is selected and appears between slider 413 and conductor 408, which is connected to center taps 418 and 418'. The voltage between slider 413 and slider 394 is accordingly the sum of $x_2 \cot (B_2-C)$ and $-x_1 \cot (B_1-C)$: the difference in sign of the two values is brought about by connecting the secondary windings 382 and 383 in the circuit in opposite phase as is suggested by the arrangement of the wires.

Secondary winding 384 energizes the winding 430 of a voltage divider 431, having a slider 432 and a center tap 433, through conductors 434 and 435. Center tap 433 is connected with slider 413 by a conductor 436, and slider 432 is actuated by manual operation of knob 43 proportional to the value of $y_1$. The voltage between slider 432 and center tap 433 is accordingly proportional to $y_1$, and by reason of the series connection including conductor 436 this voltage is added to those previously described.

Secondary winding 385 energizes the winding 440 of a voltage divider 441 having a center tap 442 and a slider 443 through conductors 444 and 445. Center tap 442 is connected to slider 432 by a conductor 446, and slider 443 is operated by manual adjustment of knob 44 in proportion to the value $-y_2$: the negative sign for this quantity is obtained by reversing the phase relationship of winding 385 with respect to winding 384, as previously discussed. Accordingly, a voltage appears between slider 443 and center tap 442 which is proportional to $-y_2$, and by reason of the series connection including conductor 446 is added to the voltages previously discussed.

A complete series circuit may now be traced from slide 394 through a portion of winding 396 or a portion of winding 397 depending on the position of slider 394, conductor 408, a portion of winding 415 or a portion of winding 415' depending on the position of slider 413, the slider, conductor 436, a portion of winding 430, slider 432, conductor 446, a portion of winding 440 and slider 443. Slider 394 is connected by a conductor 447 to the center tap 450 of a first primary winding 451 of a transformer 452 having a further primary winding 453 and a secondary winding 454. Primary winding 435 may have the same number of turns on each half of primary winding 451. The ends of primary winding 451 are connected by conductors 455 and 456 to the windings 457 and 460 of a pair of variable resistors 461 and 462 having a common slider 463. As shown, windings 457 and 460 are each circular in form and extend substantially 180 degrees around a circle. The windings are separated by two very narrow, oppositely disposed interruptions in the windings, which may be on a common form. Slider 463 is connected to slider 443 by conductor 464.

By the means described above, an alternating voltage which is the sum of four components is supplied to a circuit including the upper or lower half of primary winding 450 and a variable portion of one or the other of windings 457 and 460, depending on the position of slider 463. The amplitude of this voltage is determined by the amount of resistance added in the circuit, and the phase of the voltage is determined by which half of the primary winding is being energized: both of these factors are controlled by the position of slider 463.

Output shaft 393 of differential 391 drives the slider 465 of a voltage divider 466 having a pair of windings 467 and 468 center tapped at 469 and 470, and comprising a part of cotangent device 48 of Figure 3. Windings 467 and 468 are energized from secondary winding 386 of transformer 381 through conductors 471 and 472. Similarly output shaft 412 of differential 410 actuates the slider 473 of a voltage divider 474 having a pair of windings 475 and 478 center tapped at 476 and 479, and comprising a part of cotangent device 56 of Figure 3. Windings 475 and 478 are energized from secondary winding 387 of transformer 381 through conductors 477 and 480. A conductor 481 joins slider 473 with slider center taps 469 and 470, and center taps 476 and 479 are connected with one end of primary winding 453 by a conductor 482, a resistor 483 having the same resistance as windings 457 and 460, and a conductor 484. The other end of primary winding 453 is connected with slider 465 by conductor 485. By reason of the above connection it will be apparent that a series circuit including resistor 483 and primary winding 453 is energized from windings 386 and 387 in accordance with the sum of-cot ($B_1-C$) and cot ($B_2-C$), the amplitude of the voltage being determined by the amplitude of the respective voltages. The voltage outputs from secondary windings 382, 383, 384, 385, 386, 387 are selected, as discussed below, so that the same constant of proportionality may be applied to all the individual outputs, and the current in primary winding 453 is proportional to the denominator of the right hand portion of Equation 12, the constant of proportionality being determined by the magnitude of the resistance 483. The current in the primary winding 451 of transformer 452 has been shown to be proportional to the numerator of the fraction in the right hand portion of Equation 12, and the constant of proportionality here is determined by the setting of slider 463.

The resistances of windings 457 and 460 are chosen to be high compared to the resistance of windings 396, 397, 400, 415, 415′, 416, 430 and 449. Similarly the resistance of resistor 483 is selected to be high compared to the resistances of windings 467, 468, 475 and 478. A value of 100,000 ohms is suitable for these resistances.

The current $I_n$ flowing in primary winding 451 is related to the voltage $V_n$ between conductor 441 and slider 443, according to Ohm's law, by the expression $V_n = I_n R_n$, where $R_n$ is the total resistance in the circuit and in practice is the amount of winding 457 or winding 460 included in the circuit. Similarly the current $I_d$ flowing in primary winding 453 is related to the voltage $V_d$ between center taps 476 and 479 and center taps 469 and 470 by the expression $V_d = I_d R_d$, where $R_d$ is essentially the resistance of resistor 483. If slider 463 is adjusted so that $I_n$ is equal to $I_d$, then $$x_p = \frac{V_n}{V_d} = \frac{R_n}{R_d} \qquad (21)$$

and since $R_d$ is a constant $x_p :: R_n$. (22)

Accordingly, $R_n$ is a linear measure of the quotient.

Slider 463 is driven, through a suitable mechanical connection 486 including reduction gearing 487, from a motor 490, including a rotor 491 carried on a shaft 492, and a pair of windings 493 and 494. Winding 493 is energized from source 155 through power bus 369, quadrature capacitor 495, and ground connections 496 and 371. Winding 494 is energized through conductors 497 and 500 from the output terminals 501 and 502 of an amplifier 503 having power terminals 504 and 505 and input terminals 506 and 507. Terminal 505 is grounded at 510, terminal 501 is grounded through conductor 497 and ground connection 496, and terminal 504 is connected to power bus 369. Input terminals 506 and 507 are energized from secondary winding 454 of transformer 452 by conductors 511 and 512. A phasing capacitor 498 is connected across winding 494.

Motor 490 operates under the control of amplifier 503 in a fashion well known to those skilled in the art. As long as no alternating voltage appears between input terminals 506 and 507 of amplifier 503, winding 494 of motor 490 is not energized, and no rotation of shaft 492 takes place. When an alternating voltage is impressed between input terminals 506 and 507 of amplifier 503, winding 494 of motor 490 is energized, and rotor 491 drives shaft 492 in one direction or the other, depending upon the phase of the voltage across winding 494, which in turn depends upon the phase of the voltage on input terminals 506 and 507. The connection between shaft 492 and slider 463 is such that rotation of shaft 492 due to voltage impressed on input terminals 506 and 507 of amplifier 503 is in a proper direction to change the current in primary winding 451, compared with that in primary winding 453, so that the currents become equal. When this takes place, the fluxes in the core of transformer 452 are equal and opposite, and no resulting voltage appears across secondary winding 454. Operation of motor 490 accordingly is interrupted.

Shaft 492 of motor 490 is also effective, through a further mechanical connection 513 which may include reduction gearing 514, to move the slider 515 of a voltage divider 516 whose winding 517 is center tapped at 520. Winding 517 is energized through conductors 521 and 522 from one secondary winding 523 of a transformer 524 having a further secondary winding 525 and a primary winding 526. Winding 526 is energized from source 155 through ground connections 527 and 371 and power bus 369. Accordingly, the voltage between center tap 520 and slider 515 is determined by the position of the slider.

Secondary winding 525 of transformer 524 energizes, through conductors 530 and 531, the winding 532 of a voltage divider 533 having a slider 534 and a center tap 535. Center taps 520 and 535 are joined by a conductor 536. Sliders 515 and 534 are connected, by conductors 537 and 540, to indicator 40 which may conveniently take the form of a voltmeter. Slider 534 is actuated by knob 45.

The voltage between conductors 537 and 540 is also supplied at 71 to azimuth coupling unit 33 of Figure 2. The purpose of unit 33 is to superimpose control according to output 71 upon the particular automatic pilot being used, which may of course be electrical, hydraulic, or of any other suitable type. Unit 33 may include means for adding to the signal supplied by computer 32 a further component proportional to the rate of change of the signal: for this purpose it may be desirable to convert the alternating voltage to unidirectional voltage reconverting it to alternating voltage after the rate component has been inserted, if desired. Arrangements suitable to this use are known.

One embodiment of structure capable of controlling the ailerons, elevators, and rudder of a craft in accordance with the signal at 71 is to be in my copending application, Serial No. 33,608 filed June 17, 1948, and assigned to the assignee of the present application, where it is shown combined with an instrument landing system and a navigating computer as well.

As pointed out above, $R_n$ is a linear measure of the quotient being sought. Sliders 463 and 515 are connected with shaft 492 in such a manner that slider 515 is at center tap 520 when slider 463 is extending to the left as seen in Figure 5, so that it does not engage either winding 457 or winding 460. Windings 457 and 460 are both linear, so the amount of rotation of motor 490 required to bring $R_n$ to its desired value is linear, and the motion of slider 515 and the control of motor 490 is also linear, and a measure of $y_p$. Indicator 40 is therefore connected across two sources of voltage in series, one being adjusted to a value of $x_t$ and the other to a value of $x_p$. As suggested in Figure 5, the latter voltage is connected in phase opposition to the former, so that the voltage applied to indicator 40 is proportional to $x_p-x_t$, that is, to $x_d$.

The circuit including potential divider 401 corresponds to multiplier 50 in Figure 3. The circuit including voltage divider 417 corresponds to multiplier 60 in Figure 3. The circuit including primary winding 451 of transformer 452 comprises adder 52 of Figure 3. The circuit including the primary winding 453 of transformer 452 comprises subtracter 63 of Figure 3. Transformer 452, amplifier 503, motor 490 comprise divider 65 of Figure 3, and voltage dividers 516' and 533 comprise subtracter 67 of Figure 3.

*Structure of the along-track portion of the navigating computer*

The along-track portion of computer 32, as shown in Figure 6, is generally of the same nature as the cross-track portion just discussed in connection with Figure 5. Alternating voltage is supplied from power bus 369 through switch 578 and ground connections 579 and 371 to the primary winding 580 of a transformer 581 having a plurality of secondary windings 582, 583, 584, 585, 586 and 587. This transformer like transformer 381 in Figure 5, is shown divided. For clarity in illustrating the functional relationship, differentials 391 and 410, and input shafts 36, 37 and 390 are repeated in Figure 6; actually, only one such set of mechanical inputs is provided in the computer, and the differentials are simply provided with additional output shafts 592, 593, 611 and 612. Also only one set of knobs 41, 42, 43, 44 and 46 is provided, as shown in Figure 2 although for clarity their knobs are shown in both Figures 5 and 6.

Shaft 592 actuates the slider 594 of a voltage divider 595 having a pair of windings 596 and 597 center tapped at 598 and 599, and comprising a part of tangent device 72 of Figure 3. Secondary winding 582 of transformer 581 energizes the winding 600 of a voltage divider 601, having a center tap 602 and a slider 603, through conductors 604 and 605. Slider 603 is connected to one end of winding 596 and the end of winding 597 by a conductor 606, and center tap 602 is connected to the other ends of windings 596 and 597 by conductor 607. Slider 603 is adjustable along winding 600 by manual knob 43 to a position proportional to $y_1$. A voltage accordingly appears, between slider 594 and a conductor 647 connected to center taps 598 and 599, which is proportional in magnitude to $y_1 \tan(B_1-C)$.

Mechanical output 611 from differential 410 actuates the slider 613 of a voltage divider 614 having a pair of windings 615 and 615' center tapped at 618 and 618', and comprising a part of tangent device 82 of Figure 3. Secondary winding 583 of transformer 581 energizes the winding 616 of a voltage divider 617, having a slider 620 and a center tap 621, through conductors 622 and 623. Slider 620 is adjustable along winding 616 by manual operation of knob 44, in proportion to the magnitude of $-y_2$, and is connected to one end of winding 615 and one end of winding 615' by a conductor 624. Center tap 621 is connected to the other ends of windings 615 and 615' by conductor 625. A conductor 608 connects center taps 618 and 618' with slider 594 of voltage divider 595. Accordingly there appears between slider 613 and conductor 608 a voltage proportional to $y_2 \tan(B_2-C)$. As previously pointed out the negative sign is brought about by the phasing of the connections to transformer winding 583.

Secondary winding 584 of transformer 581 energizes the winding 630 of a voltage divider 631, having a slider 632 and a center tap 633, through conductors 634 and 635. Center tap 633 is connected with slider 613 by a conductor 636. Slider 632 is actuated by manual operation of knob 42, so that the voltage between slider 632 and center tap 633 is proportional to $x_2$.

Secondary winding 585 of transformer 581 energizes the winding 640 of a voltage divider 641 having a center tap 642 and a slider 643, through conductors 644 and 645. Center tap 642 is connected to slider 632 by a conductor 646, and is actuated by a manual operation of knob 41 so that the voltage between slider 643 and center tap 642 is proportional to $-x_1$.

Slider 594 is connected by conductor 647 to the center tap 650 on a first primary winding 651 of a transformer 652 having a further primary winding 653 and a secondary winding 654. The terminals of winding 651 are connected by conductors 655 and 656 to the windings 657 and 660 of a pair of voltage dividers 661 and 662 having a common slider 663, the latter being connected to slider 643 by conductor 664. The arrangement is such that there is applied, across a resistance determined in magnitude by the position of slider 663 on winding 657 or winding 660, a resultant voltage which is the sum of the four voltages $y_1 \tan(B_1-C)$, $-y_2 \tan(B_2-C)$, $x_2$, and $-x_1$. This sum is the numerator of Equation 15.

Mechanical output 593 of differential 391 actuates the slider 665 of a voltage divider 666, having a pair of windings 667 and 668 center tapped at 669 and 670, and comprising a portion of tangent device 72 of Figure 3. Windings 667 and 668 are energized from a secondary winding 586 of transformer 581 through conductors 671 and 672. Accordingly there appears between slider 665 and a conductor 685 connected to center taps 669 and 670 a voltage proportional to $\tan(B_1-C)$.

Mechanical output 612 from differential 410 actuates the slider 673 of a voltage divider 674, having a pair of windings 675 and 678 center tapped at 676 and 679, and comprising a part of tangent device 82 of Figure 3. Windings 675 and 678 are energized from secondary winding 587 of transformer 581 through conductors 677 and 680. Slider 673 is connected to conductor 681. There appears between slider 673 and a conductor 682 connected to center taps 676 and 679 a voltage proportional to $\tan(B_2-C)$.

Slider 665 is connected to one terminal of primary winding 653 by conductor 685, and center taps 676 and 679 are connected to the other terminal of primary winding 653 by conductor 682, resistor 683, and conductor 684. Accordingly there is impressed across resistor 683 a voltage determined by the sum of $\tan(B_1-C)$ and $-\tan(B_2-C)$.

The output of secondary winding 654 of transformer 652 is arranged to control the operation of a motor 690, having a rotor 691 carried on a shaft 692 and a pair of windings 693 and 694. The winding 693 of motor 690 is continuously energized from source 155 through power bus 369 and quadrature capacitor 695 and through ground connections 696 and 371. Winding 694 of motor 690 is energized through conductors 697 and 700 from the output terminals 701 and 702 and an amplifier 703 having power terminals 704 and 705 and input terminals 706 and 707. A phasing capacitor 698 is connected across winding 694. Power terminals 704 and 705 of amplifier 703 are energized from source 155 through power bus 369 and ground connections 710 and 371. Input terminals 706 and 707 of amplifier 703 are energized from secondary winding 654 through conductors 711 and 712.

Motor 690 acts through a mechanical connection 686 including reduction gearing 687 to actuate slider 663 with respect to windings 657 and 660. Motor 690 also acts through a mechanical connection 713 including reduction gearing 714 to operate the slider 715 of a voltage divider 716 having a winding 717 and a center tap 720. Winding 717 is energized through conductors 721 and 722 from a first secondary winding 723 of a transformer 724, having a further secondary winding 725 and a primary winding 726 energized from a source 155 through power bus 369 and ground connections 727 and 371.

Secondary winding 725 of transformer 724 energizes, through conductors 730 and 731, the winding 732 of a voltage divider 733 having a slider 734 and a center tap 735. Center tap 735 is connected to center tap 720 through a conductor 736. Slider 734 is arranged for actuation by manual knob 100. Sliders 715 and 734 are connected by conductors 737 and 740 to indicator 102. Conductors 736 and 737 are also connected to indicator 96.

It will be obvious that the structure of Figure 6 functions to solve Equation 15 in the same way that the structure of Figure 5 functions to solve Equation 13. Series electrical summing is utilized to give separately the numerators and denominators of the fractions, and the division is performed by the same ratio adjusting comparison method. The differences between the two structures are simply those of phase, determining the polarity of quantities according to the equations to be solved, and substitution of tangent for cotangent devices where the substitution is needed.

The computer shown in Figures 5 and 6 is arranged to operate on a "scale" of 10 miles per volt, and the secondary voltages required to be supplied by transformers 381 and 581 are determined by this scale, and by the maximum values to be encountered in use. A practical range of values for $x_1$, $x_2$, $y_1$, $y_2$, $x_t$, $y_t$ is plus or minus 100 miles: secondary windings 384, 385, 584, and 585 must hence supply 20 volts.

The outputs from each of voltage dividers 395, 414, 595, and 614 must be ten volts when knobs 41, 42, 43 and 44 are at 100 miles, and when angles $(C_1-C)$ and $(B_2-C)$ are 45°, since for these angles the tangent and cotangent are both unity. As a practical matter it is possible to construct devices where each of these angles can be as large as are $\tan 10.0$: the output from each of windings 381, 382, 581 and 582 must hence be 200 volts. If the number of turns in winding 453 is the same as that in each half of winding 451, and if the resistance of resistor 483 is equal to those of windings 457 and 460, the outputs from windings 386 and 387 must be 200 volts. If the number of turns in winding 653 is the same as that in each half of winding 651, and if the resistance of resistor 683 is equal to those of windings 657 and 660, the outputs from windings 586 and 587 must be 200 volts.

It is of course not necessary that the scale of voltage used in the structure of Figure 5 be the same as that used in Figure 6, nor need the outputs of transformers 524 and 724 be on the same scale as those of transformers 381 and 581. Nevertheless it is convenient to use one scale for the entire computer, and the outputs of each of windings 523, 525, 723, and 725 under this arrangement is 20 volts.

The sliders in Figures 5 and 6 are shown in the positions they would assume when a craft being flown in accordance with the practice of the invention actually was at the point $P_t$ with respect to stations located as $S_1$ and $S_2$ as shown in Figure 1. From that figure it can be determined that $x_1 = 16$ miles $\qquad B_1 = 86°$
$x_2 = 8$ miles $\qquad B_2 = 140°$
$y_1 = -96$ miles $\qquad x_t = 64$ miles
$y_2 = -28$ miles $\qquad y_t = -72$ miles
$C = 11°$ In the consideration of the data presented by Figure 1, a positive sign for an abscissa indicates that the point in question is to the right of the Y-axis, and a negative value of ordinate indicates that the point in question is on the rear side of the X-axis, both viewed from a craft moving along the course in the desired direction. Angles are in all cases measured clockwise, and instantaneous polarities are indicated by plus and minus signs at the ends of the several transformer windings.

The following voltage relations are found to exist in Figure 5:

| | Volts | |
|---|---|---|
| Output of winding 382 | 200 | |
| Voltage between slider 403 and center tap 402 | 16 | (402 positive) |
| Voltage between slider 394 and center tap 398 | .43 | (398 positive) |
| Output of winding 383 | 200 | |
| Voltage between slider 420 and center tap 421 | 8 | (421 positive) |
| Voltage between slider 413 and center tap 418 | .65 | (418 positive) |
| Output of winding 384 | 20 | |
| Voltage between slider 432 and center tap 433 | 9.6 | (433 positive) |
| Output of winding 385 | 20 | |
| Voltage between slider 443 and center tap 442 | 2.8 | (443 positive) |
| Voltage between slider 463 and center tap 450 | 7.88 | (450 positive) |
| Output of winding 386 | 200 | |
| Voltage between slider 465 and center tap 469 | .27 | (469 positive) |
| Output of winding 387 | 200 | |
| Voltage between slider 473 and center tap 476 | .80 | (476 positive) |
| Voltage between conductors 482 and 485 | 1.07 | (480 positive) |
| Output of winding 523 | 20 | |
| Voltage between slider 515 and center tap 520 | 7.35 | (520 positive) |
| Output of winding 525 | 20 | |
| Voltage between slider 534 and center tap 535 | 6.40 | (535 positive) |
| Voltage between conductors 537 and 540 | .95 | (540 positive) |

The following voltage relations are found to exist in Figure 6:

| | Volts | |
|---|---|---|
| Output of winding 582 | 200 | |
| Voltage between slider 603 and center tap 602 | 96 | (602 positive) |
| Voltage between slider 594 and center tap 598 | 35.8 | (598 positive) |
| Output of winding 583 | 200 | |
| Voltage between slider 620 and center tap 621 | 28 | (620 positive) |
| Voltage between slider 613 and center tap 618' | 3.45 | (318' positive) |
| Output of winding 584 | 200 | |
| Voltage between slider 632 and center tap 633 | 0.80 | (632 positive) |
| Output of winding 585 | 20 | |
| Voltage between slider 643 and center tap 642 | 1.60 | (642 positive) |
| Voltage between slider 663 and center tap 650 | 40.0 | (650 positive) |
| Output of winding 586 | 200 | |
| Voltage between slider 665 and center tap 669 | 37.3 | (665 positive) |
| Output of winding 587 | 200 | |
| Voltage between slider 673 and center tap 678 | 12.3 | (673 positive) |
| Voltage between conductors 682 and 685 | 49.6 | (685 positive) |
| Output of winding 723 | 20 | |
| Voltage between slider 715 and center tap 720 | 8.08 | (715 positive) |
| Output of winding 725 | 20 | |
| Voltage between slider 734 and center tap 735 | 7.2 | (734 positive) |
| Voltage between conductors 737 and 740 | .88 | (737 positive) |

The trigonometric devices

Figures 7, 8, 9:
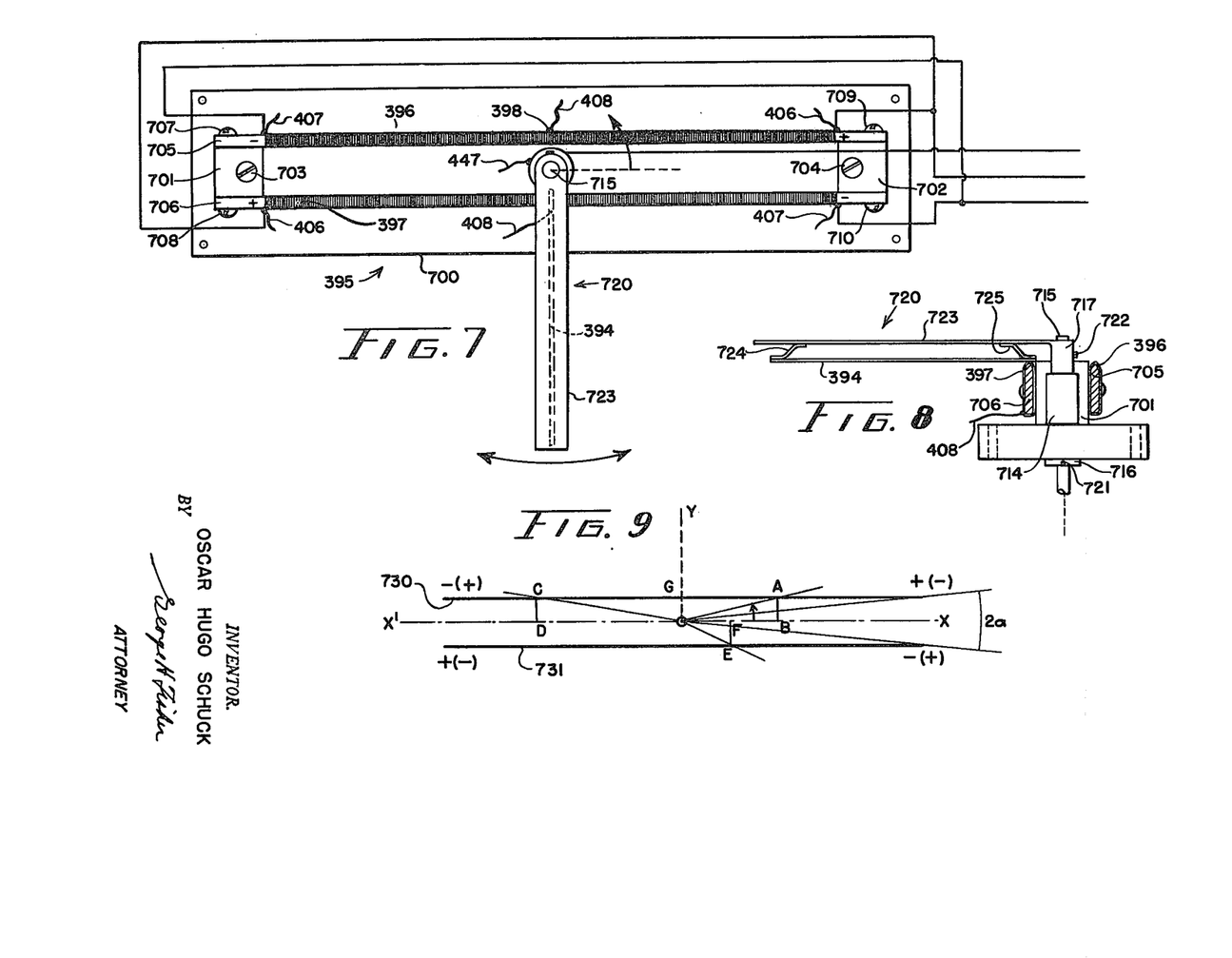
Figures 7 and 8 show mechanical details of a portion of the invention.
Figure 9 is a sketch showing the functioning of the devices of Figures 7 and 8.

The structure and operation of the cotangent and tangent devices indicated at 48, 56, 72, 82 in Figure 3 remain for discussion, and are shown in Figures 7 and 8 and in Figure 9: while the parts in Figures 7 and 8 are indicated by numerals identifying them with device 48, the discussion is general, applying to all four of the units except as otherwise noted.

Each device comprises a pair of voltage dividers. Divider 395 comprises a rectangular insulating base 700 having holes in its four corners for mounting the device in any suitable fashion. Insulating blocks 701 and 702 are fastened by recessed bolts 703 and 704 to the ends of the base, and to these blocks a pair of linear insulating forms 705 and 706 are fastened by bolts 707, 708, 709 and 710. Form 705 carries a uniform winding 396 of fine resistance wire center tapped at 398. Similarly, form 706 carries a uniform center tapped winding 397. Indications of instantaneous polarity have been placed at the ends of forms 705 and 706 in Figure 7 to show the phase relation between voltages applied across windings 396 and 397 by conductors 406 and 407.

Journalled in a bushing 714 moulded or otherwise fixed in base 700 is a shaft 715, axially positioned by a stop collar 716 and the hub 717 of a contact member 720, which are fixed to the shaft by set screws 721 and 722 respectively. An arm 723 extends from hub 717, and a straight wire of conducting material, comprising slider 394 of Figure 5, is supported from arm 723 by suitable spring members 724 and 725. Conductor 447 is fastened to bushing 714 as shown in Figure 7, and electrical communication to slider 394 is thus established. The arrangement is such that the slider is resiliently urged into continuous engagement with one or the other of windings 396 and 397 throughout a major portion of its rotational movement. Shaft 715 comprises mechanical connection 392 of Figure 5.

The arrangement is initially set up so that when arm 723 is perpendicular to the direction of windings 396 and 397, it is aligned with center taps 398 and 399. $B_1$ and $C$ are now set to such values that their difference, $B_1-C$ is 90°, and hub 717 is fixed to shaft 715.

The foregoing description applies to voltage divider 395 of cotangent device 48. Voltage divider 466 is constructed in the same fashion, energized in the opposite phase, and installed according to the same procedure for driving by shaft 393. Voltage dividers 395 and 466 make up cotangent device 48 of Figure 3.

The structure used for voltage dividers 414 and 474, making up cotangent device 56, is the same. The slider of divider 414 is arranged for driving from the indicated position in accordance with movement of mechanical connection 411 from the position where $B_2-C$ is 90°, and the phase of the energization of the divider is opposite to that of divider 395. The slider of divider 474 is arranged for driving from mechanical connection 412, and the divider is energized in the same phase as divider 395.

In Figure 9 the resistance windings are shown as straight lines 730 and 731, everywhere parallel to and equidistant from a line X—X' passing through the axis O of the contact. Several positions of the contact are shown, in which it engages the windings at point A, C, and E. The voltage between the center tap and the slider is measured by the projection on the line X—X' of the line joining O with the point of contact. For the case of the point A this projection OB has the value $$OB = AB \cot \angle BOA = OG \cot \angle XOA$$

when the angle is measured counterclockwise from the direction OX. This remains true for any angle within 360°.
Similarly $$OD = CD \cot \angle XOC$$

and $$OF = EF \cot \angle EOF$$

The structure described thus gives an output algebraically proportional to the cotangent of the angle of displacement of the slider from a zero position along the line OX, except in two small ranges of extent $2a$ as shown. The magnitude of $2a$ can be reduced by selection of a proper ratio of the distance between the windings to the length of the windings.

Figure 9 can also be used to illustrate the operation of the tangent devices required in the practice of the invention: the only changes necessary are reversal of the phase of the energization, indicated by the parenthesized indicia of instantaneous polarity and the selection of a new zero of direction, indicated by the line OY. Now $OD = DC \cot \angle COD =$
$\qquad DC \cot (90 - \angle COD) = OG \tan \angle YOC$ The structure thus can be adjusted to give an output algebraically proportional to the tangent of the angle of displacement of the slider from the newly defined zero position, and voltage dividers 595, 614, 666, and 674 may be initially adjusted and phased accordingly to make up tangent devices 72 and 82 of Figure 3.

*Summary*

In the foregoing description and the annexed drawing I have disclosed the details of structure of a computer for indicating, or controlling, or both indicating and controlling, the position of a craft with respect to a set of coordinate axes. The apparatus automatically computes the position of the craft when only its bearings from a pair of points of known position on the set of axes, and the bearing of the axis of ordinates, are known. The structure includes a novel means of performing division automatically by separately computing the dividend and the divisor, representing them as electrical quantities, and equating these quantities by taking a variable portion of one for comparison with the other, the magnitude of the portion required being a measure of the desired quotient.

Numerous objects and advantages of my invention have been set forth in the foregoing description, together with details of the structure and function of the invention, and the novel features thereof are pointed out in the appended claims. The disclosure is illustrative only, however, and I may make changes in detail, especially in matters of shape, size, and arrangement of parts, within the principle of the invention, to the full extent indicated by the broad general meaning of the terms in which the appended claims are expressed.

I claim as my invention:

1. In a device of the class described, in combination: first radio responsive means giving an output determined by the direction of a craft from a first point of known position; second radio responsive means giving an output determined by the direction of said craft from a second point of known position; means adjustable to give outputs varying in accordance with the coordinates of said points on a set of coordinate axes one of which is aligned with a path to be followed; means adjustable to give an output varying with the direction of one of said axes; a first network comprising variable impedance means, a device giving an output in accordance with currents flowing therein, a plurality of sources of voltage variable in amplitude by said adjustable means and said radio responsive means, and means interconnecting said member, said device, and said sources so that current in said device changes with change in any of said means; a second impedance network comprising said output device, a further plurality of sources of voltage variable in amplitude by said last named adjustable means and said radio responsive means, and means interconnecting said device and said sources so that current in said device changes with change in any of said means; and means varying said variable impedance means until the currents in said networks assume a desired relationship.

2. In a device of the class described, in combination: first radio responsive means giving an output determined by the direction of a craft from a first point of known position; second radio responsive means giving an output determined by the direction of said craft from a second point of known position; means adjustable to give outputs varying in accordance with the coordinates of said points on a set of coordinate axes one of which is aligned with a path to be followed; means adjustable to give an output varying with the direction of one of said axes; a first network comprising variable impedance means, a device giving an output in accordance with current flowing therein, a plurality of sources of voltage variable in amplitude by said adjustable means and said radio responsive means, and means interconnecting said device and said sources so that current in said device changes with change in any of said means; a second impedance network comprising said output device, a plurality of sources of voltage variable in amplitude by said last named adjustable means and said radio responsive means, and means interconnecting said device and said sources so that current in said device changes with change in any of said means; and means varying said variable impedance means until the currents in said networks are equal.

3. In a device of the class described, in combination: first radio responsive means giving an output determined by the direction of a craft from a first point of known position; second radio responsive means giving an output determined by the direction of said craft from a second point of known position; means adjustable to give outputs varying in accordance with the coordinates of said points on a set of coordinate axes, one of which is aligned with a path to be followed; means adjustable to give an output varying with the direction of one of said axes; a first network comprising a device giving an output in accordance with currents flowing therein, a plurality of sources of voltage variable in amplitude by said adjustable means and said radio responsive means, and means interconnecting said device and said sources so that a first current in said device changes with change in any of said means, and variable means for changing the amplitude of said current and reversing its sense in said device; a second impedance network comprising said output device, a plurality of sources of voltage variable in amplitude by said last named adjustable means and said radio responsive means, and means interconnecting said device and said sources so that a second current in said device changes with change in any of said means; a motor; means connecting said motor to said variable means for operation thereof to make said first current equal and opposite to said second current; and motor control means energizing said motor in accordance with the output of said device.

4. Means for determining a coordinate of the location of a craft with respect to a pair of axes, one of which is aligned with a path to be followed, when its bearings from each of a pair of fixed stations, the bearing of one of said axes, and the coordinates of the locations of said stations are known, comprising, in combination: means adjustable in accordance with each of said bearings; means giving first and second difference angle outputs proportional to the differences between each of said first named bearings and said second named bearing; means giving a first output proportional to a discontinuous trigonometric function of said first difference angle output, and a second output proportional to the same function of said second difference angle output; means giving a first pair of outputs proportional to the coordinates of said first station, and a second pair of outputs proportional to the coordinates of said second station; means giving a third output, proportional to the product of said first output and one of said first pair of outputs, and a fourth output, proportional to the product of said second output and one of said second pair of outputs; means combining said third and fourth outputs with the other outputs of said first and second pair to give a dividend output; means combining said first and second outputs to give a divisor output; and means combining said dividend and divisor outputs to give a quotient output which is the desired coordinate of the location of said craft.

5. Means for determining a coordinate of a craft with respect to a pair of axes, one of which is aligned with a path to be followed, when its bearing is known from each of a pair of fixed stations of known location with respect to said axes, and when the bearing of one of said axes is also known, comprising, in combination: means adjustable in accordance with the abscissa and ordinate of the location of each station, means adjustable in accordance with each of said bearings; means subtracting said last named bearing from each of said first named bearings to give first and second difference angles related to said first and second stations respectively; means giving first and second outputs proportional to the cotangents of said first and second difference angles; means giving third and fourth outputs and fifth and sixth outputs proportional respectively to the abscissa and ordinate of the location of said first station and the abscissa and ordinate of the location of said second station; means giving seventh and eighth outputs proportional to the product of said first and third outputs and the product of said second and fifth outputs, means combining said fourth, sixth, seventh and eighth outputs to give a dividend output; means combining said first and second outputs to give a divisor output and means combining said dividend output and said divisor output to give a final output which is the quotient desired.

6. Means for determining a coordinate of a craft with respect to a pair of axes, one of which is aligned with a path to be followed, when its bearing is known from each of a pair of fixed stations of known location with respect to said axes, and when the bearing of one of said axes is also known, comprising, in combination: means adjustable in accordance with the abscissa and ordinate of the location of each station; means adjustable in accordance with each of said bearings; means subtracting said last named bearing from each of said first named bearings to give first and second difference angles related to said first and second stations respectively; means giving first and second outputs proportional to the tangents of said first and second difference angles; means giving third and fourth outputs and fifth and sixth outputs proportional respectively to the abscissa and ordinate of the location of said first station and the abscissa and ordinate of the location of said second station; means giving seventh and eighth outputs proportional to the product of said first and fourth outputs and the product of said second and sixth outputs, means combining said third, fifth, seventh and eighth outputs to give a dividend output; means combining said first and second outputs to give a divisor output; and means combining said dividend output and said divisor output to give a final output which is the quotient desired.

OSCAR HUGO SCHUCK.

References Cited in the file of this patent

UNITED STATES PATENTS

| Number | Name | Date |
| --- | --- | --- |
| 2,137,847 | Libman | Nov. 22, 1938 |
| 2,468,179 | Darlington et al. | Apr. 26, 1949 |
| 2,472,129 | Streeter | June 7, 1949 |
| 2,488,448 | Townes et al. | Nov. 15, 1949 |
| 2,541,277 | Omberg et al. | Feb. 13, 1951 |